Dec. 17, 1935. H. J. MASTENBROOK 2,024,774
STEAM TRAP
Filed March 10, 1932 2 Sheets-Sheet 1
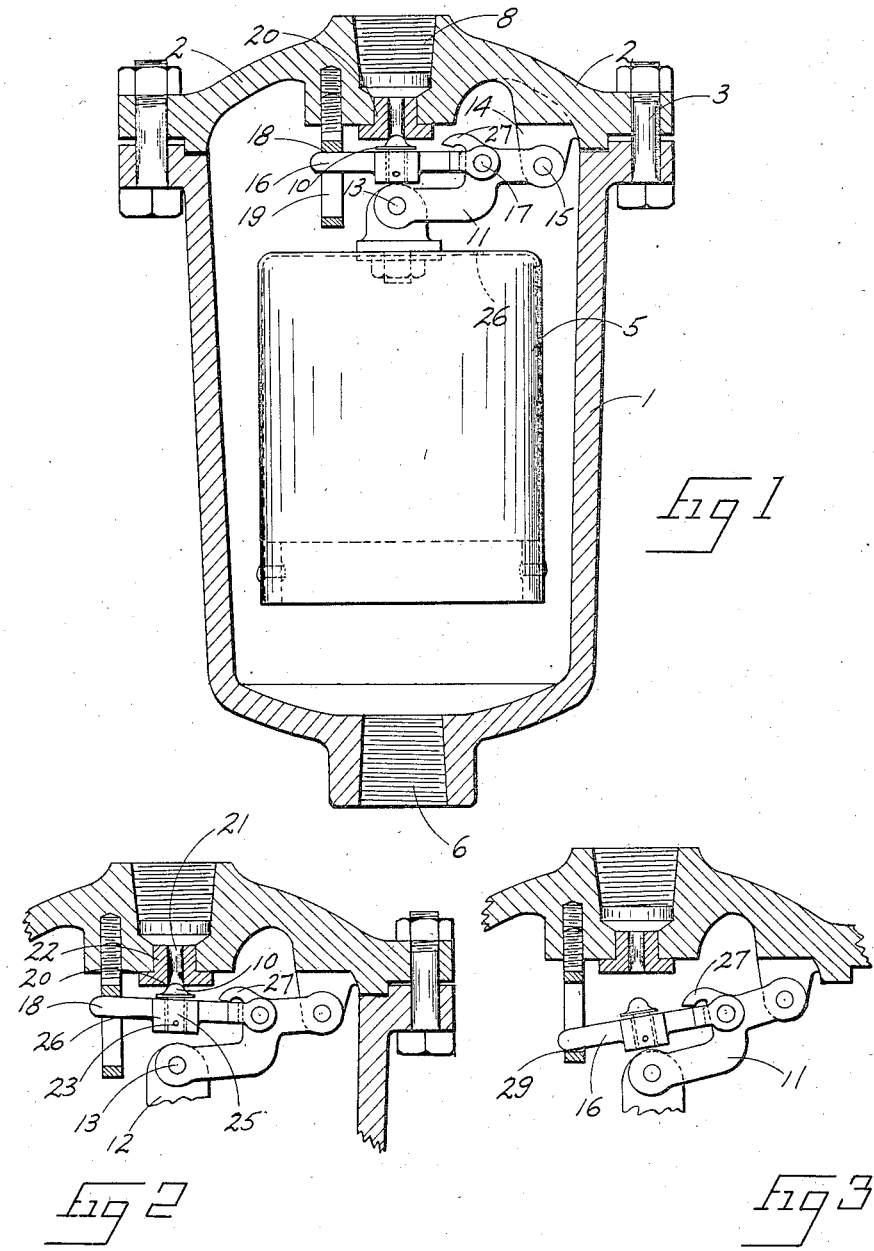
Inventor
HENRY J. MASTENBROOK
By Richey & Watts
Attorney

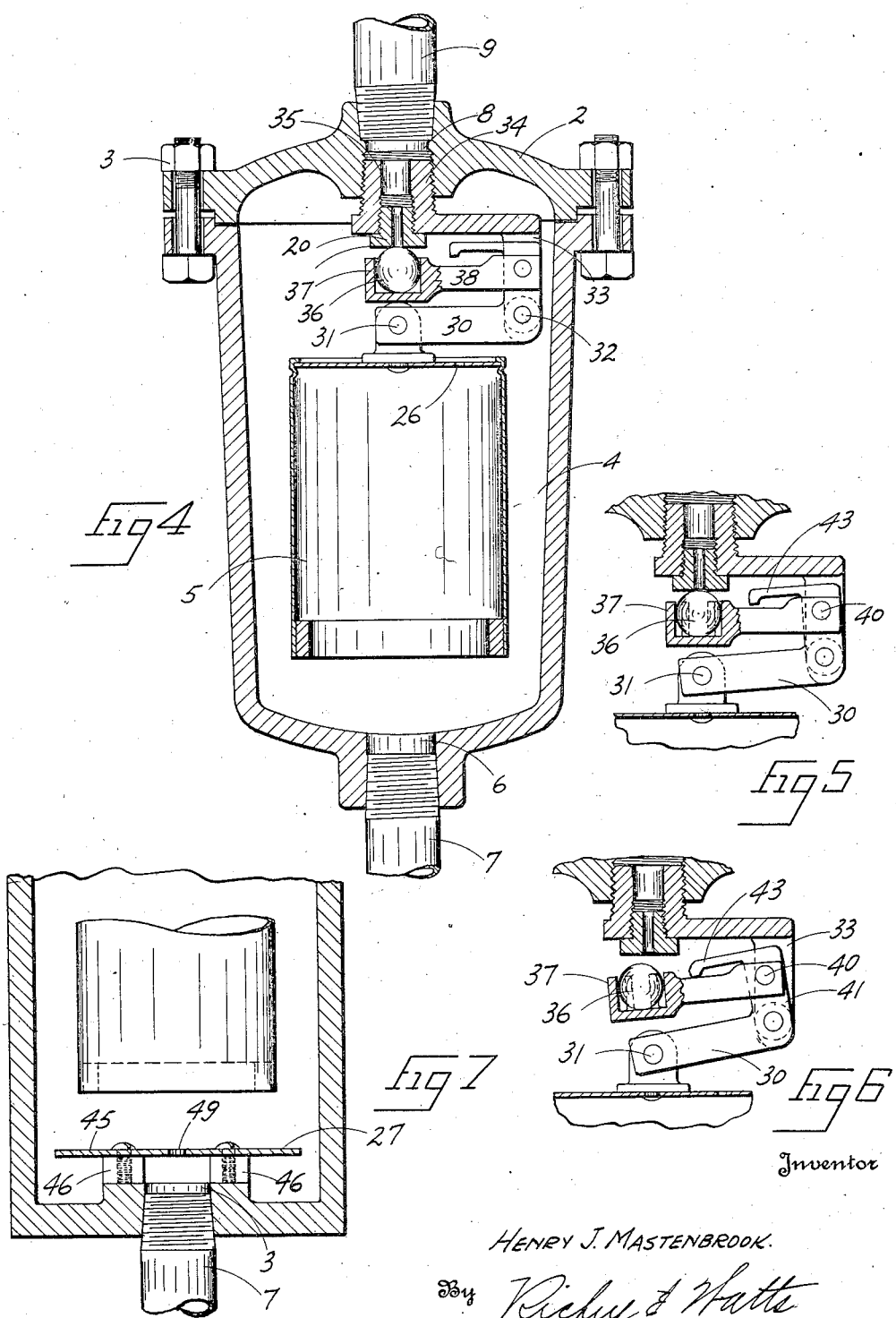

Patented Dec. 17, 1935

2,024,774

UNITED STATES PATENT OFFICE 2,024,774

STEAM TRAP

Henry J. Mastenbrook, Cleveland, Ohio, assignor to The Swartwout Company, Cleveland, Ohio, a corporation of Ohio Application March 10, 1932, Serial No. 597,938

8 Claims. (Cl. 137—103)

This invention relates to a steam trap. It has to do, more particularly, with an improved discharge valve mechanism including the operating instrumentalities for a trap of the inverted bucket type, altho it will be understood that the teachings of this invention may well be incorporated in traps of other design.

One object of this invention lies in the provision of a steam trap incorporating such improvements as will make for a quick and easy operation of the discharge valve, even under conditions of high pressure. Another object of this invention is to obtain a positive action on the part of the discharge valve without such attendant disadvantages as sticking, chattering or oscillation of the closure member. Another object is to further supplement the efficiency of operation of the trap by controlling the path of travel of inflowing fluid so as to prevent premature closing of the discharge valve on one hand and on the other hand to obtain a scourging of the bottom and walls of the trap of extraneous deposits such as slime, scale, etc.

The above desiderata are obtained in the instant invention by the provision of novel operating linkage for the valve closure member that is intended to afford a high mechanical advantage for first breaking the closure away from its seat and to subsequently afford a high ratio of movement for clearing the closure away from the discharge outlet. In regard to the matter of preventing premature closing of the discharge outlet, a baffle is provided that overlies the inlet opening and shields the open end of the float from the direct force of the inflowing fluid, the baffle serving to direct the flow radially toward the wall of the trap and along the bottom thereof.

Other objects and advantageous features of this invention will be noted in the accompanying detailed description and accompanying drawings, wherein like characters of reference designate like parts, and wherein:

Figure 1 is a vertical section through a steam trap showing the discharge valve and one form of operating linkage therefor.

Figure 2 is a detail in section showing the first stage of operation wherein the closure is first "cracked" from its seat.

Figure 3 is a detail similar to that of Fig. 2, wherein the bucket has descended to the bottom of the trap and wherein the discharge outlet has been wholly uncovered.

Figure 4 is a vertical section of a steam trap showing another form of operating linkage for the discharge outlet closure member.

Figure 5 is a detail in section of the operating linkage showing the positional relation of the parts at the initiation of the operation of breaking the closure member away from its seat.

Figure 6 is a detail similar to that of Fig. 5 showing the closure member removed from its seat.

Figure 7 is a detail in section of the lower half of a steam trap such as that shown in Figs. 1 and 4, illustrating the deflector for disbursing the inflowing condensate.

With reference to the drawings, I have shown in Figures 1 and 4 two steam traps of the inverted bucket type that are identical in design, however, incorporate slightly different systems of operating linkage for the discharge valve. The linkage of the trap shown in Figure 1 is designed to place a powerful pull on the discharge closure to initially crack it from its seat and to thereafter impart a high ratio of movement thereto to withdraw the same from its seat. In the disclosure of Figure 4, power is sacrificed somewhat in cracking the closure away from its seat in favor of quick movement, altho a high ratio of movement is afforded here, as in the linkage of Figure 1, to draw the closure away from its seat.

A general description of the steam trap per se will be given at this point, which will apply equally to the trap of Fig. 1 as well as Figure 4, after which the operating linkage for the discharge closures of each respective showing will be dealt with in detail.

With reference to Figure 1, I have shown a steam trap of the inverted bucket type as comprising a hollow shell 1 surmounted by a top or cover 2 that is held in place by means of bolts 3, it being understood that a gasket or seal is interposed between the cover and the housing to effect a water tight joint. The inner wall of the housing or shell defines a float chamber 4 wherein an open bottom inverted float 5 is suspended from the operating linkage associated with the discharge closure, the float having the usual vent 26 in the closed end thereof.

The inlet is taken through the bottom of the shell, as indicated at 6, the wall of the orifice being threaded for the reception of a pipe 7 communicating with a steam line, container, or other source of fluid (not shown). The discharge 8 is taken through the cover or top, the structure of Figure 1 differing slightly over that of Figure 4 to accommodate differences in the closure members and the metod of attaching the operating linkage.

In both Figures 1 and 4, the discharge orifice terminates in a threaded boss into which is threaded one end of a discharge pipe 9. However, in Figure 1 the lower end of the boss is constricted and a valve seat member 20 having a passage of reduced diameter has a pressed fit with the wall thereof. In Figure 4, the lower end of the bore is threaded for the reception of a reducing member 34, having a passage therein threaded at the lower end for the reception of the valve seat member 20.

Under ordinary conditions of operation, the trap as well as the inlet pipe is filled with water through which steam constantly percolates and rises to the interior of the bucket and imparts sufficient buoyancy thereto to hold the discharge valve closed, that is, up to a certain extent, it being understood that there is always a certain amount of leakage coincident with the inflow of steam and the rate of escape of the steam through the outlet 26. When the percolation of steam is arrested, as when a slug of water traverses the inlet pipe, the steam in the bucket is vented and gives way to water whereupon the bucket sinks toward the bottom of the trap and opens the discharge valve, permitting the contents of the trap to discharge. The trap will discharge until such time as steam again enters the float and buoys up the same, which results in the closing of the discharge outlet up to the degree indicated.

As hereinabove noted, the operation of the discharge valve is dependent on the rise and fall of the float bucket. In the present invention, the operating linkage connected with the float and the discharge valve consists in a system of levers adapted to afford, in the device shown in Figs. 1 to 3 inclusive, a high mechanical advantage for initially breaking the closure away from its seat, albeit, the system shown in Figs. 4 to 6 sacrifices power to some extent in favor of rapid movement. In both instances, after the closure member is once broken away from its seat, a high ratio of movement is available for clearing the closure away from obstructing relation to the valve seat.

With reference to Fig. 1, it will be noted that the float 5 is associated with the connected levers 11 and 16 that are intended to offer a high mechanical advantage for breaking the concavo-convex closure member 10 away from its seat 20. I preferably intend that the ratio of movement between the travel of the bucket and the movement of the closure be at least 5 to 1 for initially cracking open the valve, although it will be readily understood that in steam traps of varying sizes the ratio may vary accordingly.

The float is hung on the lever 11 by means of the apertured ears 12 bolted to the top of the float, the numeral 13 indicating a pivot therebetween. The lever is fulcrumed at its opposing offset end on a pair of apertured supports 15 integral with the under side of the cover and depending therefrom, the connection being made pivotal through the pin 15. The second lever 16 which mounts the valve closure member 10 on a transverse pivot 23 located approximately at the center of the lever 16 is pivotally connected to the first lever at the upper level of the bend, the pivot being indicated by the numeral 17. The fulcrum of the lever 16, as indicated by the numeral 18, occurs at a point where the free end contacts with the upper side of the slot in the clevis 19 suspended from the cover 2, in which the free end of the lever works.

The relationship of the pivot points is such that a ratio of at least 3 to 1 is available for moving the lever 16 coincident with the drop of the bucket. A ratio of at least 2 to 1 is afforded by the lever 16 for breaking away the closure so that the combined effort of the two levers affords at least a 5 to 1 ratio that is sufficient to produce a powerful pull on the closure member 10 to initially "crack open" the outlet as shown in Fig. 2.

When the bucket drops, the closure member will be dragged downwardly and to the right to crack the valve open. The pressure within the chamber is considerably greater than the pressure without and the closure member will tend to reseat since it is in the direct path of the outrushing condensate. This tendency on the part of the closure to reseat will also tend to hold the free end of the lever 16 against its fulcrum by reason of the transverse pivotal connection between the valve closure and the lever.

At the upper level of the bend of the lever 11 I have provided a hook-shaped "kicker" 27 that is adapted to come into contact with the lever 16 adjacent its pivot at a predetermined point in the fall of the bucket. This kicker acts to drag the lever 16 away from its fulcrum and the free end thereof falls to the bottom of the slot in the clevis, as shown in Fig. 3, urged, of course, by the kicker which prevents the oscillation thereof between upper and lower position in response to the directional force of the discharging contents of the trap. The closure which overlies the pivotal connection of the lever 11 with the bucket now falls at the same speed as the bucket, which continues to descend until the free end of the lever 16 reaches the bottom of the clevis and cooperates with the lever 11 through the kicker 27 to form a rigid truss, supporting the bucket, preferably, clear of the bottom of the trap. As soon as the closure is broken away from its seat, and the kicker 27 picks up the lever 16, the lever 16 falls with the same velocity as the float bucket and the same amount, hence, a powerful leverage is provided for breaking the closure away from its seat, however, after once broken away is no longer affected and the end closure moves downward with the bucket A and at the same velocity.

Referring to Figs. 4 to 6, inclusive, the steam trap disclosed therein has been described in detail supra as to its essential elements. However, the valve operating linkage differs in certain respects over the linkage of Fig. 1 in that a high mechanical advantage is sacrificed somewhat in order that quicker action may be imparted to the closure member to move it away from its seat. Further, the closure member takes the form of a ball rather than the pivoted concavo-convex member of Fig. 1, and is moved away from sealing relation with the discharge outlet by reason of a thrust thereon rather than a pull.

The operating linkage consists in the levers 30 and 38, the lever 30 being pivotally connected to the float, as at 31, and is fulcrumed as at 32 on the depending spaced supports 33 formed as a part of a bracket extending to one side of and being integral with the reducing member 34 screwed into the wall of the outlet orifice 8. The lever 38 is pivotally connected, as at 40, to the lever 32 and mounts a ball cage 37 at the outer end thereof carrying a ball closure member 36. The ball is preferably afforded a certain freedom of movement in this cage which is made up of a plurality of upwardly projecting fingers which may be closed inwardly therearound to the desired clearance.

The lever 30 is essentially a lever of the first class and affords a ratio of at least 3 to 1 for moving the lever 38. However, this lever is substantially equal in length to the lever 30 and is intended to be moved to the left as the float drops. It will be appreciated that a much more rapid movement will be imparted to the arm 38 by reason of the 3 to 1 ratio than the arm 16 in Fig. 1 which results in a quicker opening of the valve and incidently a wider opening of the valve in proportion to a lesser travel of the float. Although I sacrificed power to a certain extent, I have speeded up the action of the closure, albeit in the valve shown in Figs. 1 to 3, inclusive, a relatively slow opening of the valve is obtained which may be more desirable in some instances.

In this system, as in the system shown in Figs. 1 to 3, a kicker 43 is provided that operates essentially in the same manner as the kicker shown in Fig. 1 to apply an operative positive force to drag the arm 48 down with the bucket as soon as contact is made between the kicker and the arm. The operation of this particular type of linkage will be quite clear with comparison of Fig. 4 with Figs. 5 and 6. When the float 5 drops, the lever 30 pivots about its fulcrum 32 and the lever 38, as well as the ball 36, are both subjected to a thrust toward the left which causes the left side of the ball to ride over the valve seat and to create a slight clearance between the right side of the ball and its seat, whereupon the contents of the trap may escape into passage 21. The discharging contents causes the lever 38 to remain in substantially horizontal position subject to further movement toward the left as the float drops lower until such time as the "kicker" engages the lever and pulls the same and the ball away from its seat to open the discharge outlet wide. With the discharge pipe unobstructed the contents quickly discharge and steam again fills the trap, whereupon the float rises and the spherical valve member seats over the discharge passage 21.

In Fig. 7, I have shown a steam trap wherein means have been provided for distributing the fluid and condensate entering through the lead 7 radially toward the wall of the steam trap, albeit a certain amount of the inrushing fluid is allowed an unobstructed flow into the interior of the steam trap.

This device preferably comprises a circular baffle plate 45 that is superposed over the inlet on the spaced members 46 projecting upwardly from the bottom of the trap on either side of the inlet orifice. A slight clearance is afforded between walls of the trap and marginal edge of the plate and further the plate is centrally apertured as at 49, the diameter of the aperture being considerably reduced with relation to the diameter of the inlet. Inflowing fluid impinges against the under side of the baffle and is distributed radially in all directions toward the wall of the trap, however, a certain amount of inflowing condensate and steam escapes through the aperture 49 upwardly into the float chamber.

It will be quite apparent that when the outlet orifice is uncovered and the trap is discharging, the inflowing steam and water will be directed radially toward the walls of the steam trap and away from the open lower end of the bucket. This has two important functions, one of which results in the scavenging or scourging of the walls of the trap of extraneous material which is carried along in the fluid stream and discharged through the pipe 8. The other advantage derived consists in the fact that the inflowing steam and water is not permitted to rush into the open end of the float 5, causing the same to rise prematurely. It is to be understood that the baffle plate may be used with either of the traps shown in Figs. 1 and 4 and is intended to supplement the mechanical linkage in producing a steam trap that will operate satisfactorily for the purpose intended without danger of any premature closing of the outlet orifice during discharge.

In the foregoing description and accompanying drawings, I have illustrated and described two forms of mechanical linkage for operating the discharge valve closure of a steam trap, however, certain variations and departures will occur to those skilled in the art which will be well within the scope of this invention, and therefore I do not care to be limited to the precise showing except as indicated by the claims appended hereto.

Having thus described my invention what I claim is:—

1. A steam trap comprising a float chamber having a discharge outlet and a discharge valve therefor comprising a valve seat and a closure member, a float arranged in said float chamber and adapted to open said valve when moved in one direction and to close said valve when moved in the opposite direction, means for connecting said float to said discharge valve comprising a compound system of levers comprising a link supporting said valve closure member, a lever pivotally connected to said float and to said link, and stop means on said lever and engaging said link for limiting the pivotal movement therebetween, said system of levers being effective to impart a high mechanical advantage for moving the valve closure away from its seat in response to movement of said float in one direction for a predetermined distance and to thereafter abruptly change to afford a reduced mechanical advantage for clearing said closure away from its seat at substantially the same speed as the movement of the float.

2. A steam trap comprising a housing, the walls of which define a float chamber having an inlet and an outlet, a discharge valve associated with said outlet comprising a valve seat and a valve closure member, a float arranged in said float chamber and adapted to open said discharge valve when moved in one direction and when moved in the other direction to close said discharge valve, means for connecting said float to said valve, said means comprising a compound system of levers whereby a high mechanical advantage is obtained for initially moving the valve closure away from its seat in a direction transverse to the axis of the valve seat in response to movement of the float in one direction for a predetermined distance and at a low ratio of movement with respect to the movement of the float and thereafter imparting a high ratio of movement to the closure in a direction substantially parallel to the axis of the valve seat to clear said closure away from said valve seat.

3. A steam trap comprising a housing having an inlet and an outlet, a float arranged in said housing adapted to move in one direction or the other, a discharge valve associated with said outlet including a valve seat and a closure member, means for connecting said float with said discharge valve comprising a compound system of levers including a lever for supporting said closure member, and a second lever pivotally connected to said supporting lever and pivotally connected to said float, said system of levers being adapted to impart a low substantially constant ratio of movement to the valve closure to initially crack open the valve and to thereafter impart a high substantially constant ratio of movement to the valve closure in response to further travel of the float to clear said closure away from its seat at substantially the same speed as the speed of the float.

4. A steam trap comprising a housing, the walls of which define the float chamber, a float in said float chamber, an inlet, an outlet having a discharge valve associated therewith, said discharge valve including a closure member and a valve seat, a linkage for connecting said float with said discharge valve, said linkage including a lever for supporting said closure member, a second lever pivotally connected to said first lever and pivotally connected to said float whereby a high substantially constant mechanical advantage is obtained for initially moving said closure away from its seat in response to movement of said float and means for limiting the pivotal movement between said levers to afford a reduced, substantially constant mechanical advantage for moving said closure at substantially the same speed as the speed of the float in response to further movement of said float.

5. In a steam trap, a float chamber, an inlet, an outlet having a discharge valve associated therewith including a valve seat and a closure member, a float arranged to travel in said float chamber and being connected to said discharge valve, said connection between said float and said discharge valve including a lever for supporting said closure member, a second lever pivotally connected to said first lever and pivotally connected to said float whereby a high mechnical advantage is obtained for moving said closure member away from its seat in response to movement on the part of the said float and means on said second lever adapted to contact with said first lever after a predetermined movement of the float whereby a reduced mechanical advantage is afforded to move said closure away from its seat.

6. In a steam trap of the inverted bucket type, the combination of a float, a valve closure member, and an operative linkage therebetween comprising a link supporting said valve closure member at its mid portion, a fixed abutment on the same side of the link at one end, a lever connecting the other end of said link to said float, said lever having a projecting part or kicker over-reaching the point of pivotal connection with said link and engageable with said link to limit the pivotal movement between said link and said lever.

7. In a steam trap of the inverted bucket type, the combination of a float, a valve closure member, and an operating linkage therebetween comprising a link supporting said valve closure member, a lever pivotally mounted on a fixed part of said trap and pivotally connected to said float and to said link and having a projecting part or kicker over-reaching the point of pivotal connection with said link and engageable with said link to limit the pivotal movement between said link and said lever.

8. In a steam trap of the inverted bucket type, the combination of a float, a valve closure member, and an operating linkage therebetween comprising a link supporting said valve closure member, a lever pivotally mounted on a fixed part of said trap and pivotally connected to said float and to said link and means for limiting the pivotal movement between said link and said lever.

HENRY J. MASTENBROOK.